March 1, 1949.  R. A. ARTHUR  2,463,492
PRESSURE REGULATOR
Filed Dec. 4, 1944  2 Sheets-Sheet 2
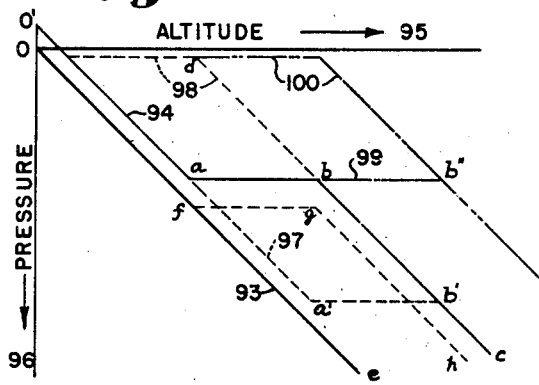
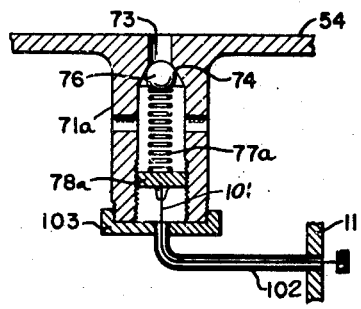
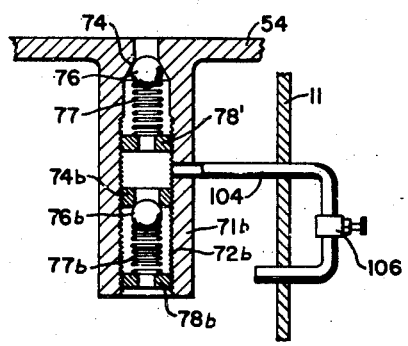
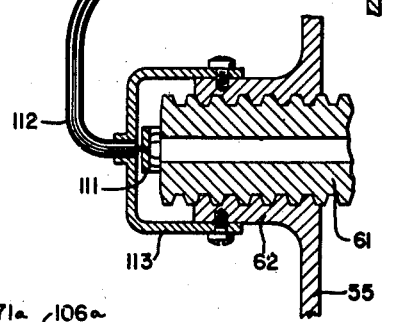
Inventor
ROBERT A. ARTHUR
By
Attorney Patented Mar. 1, 1949

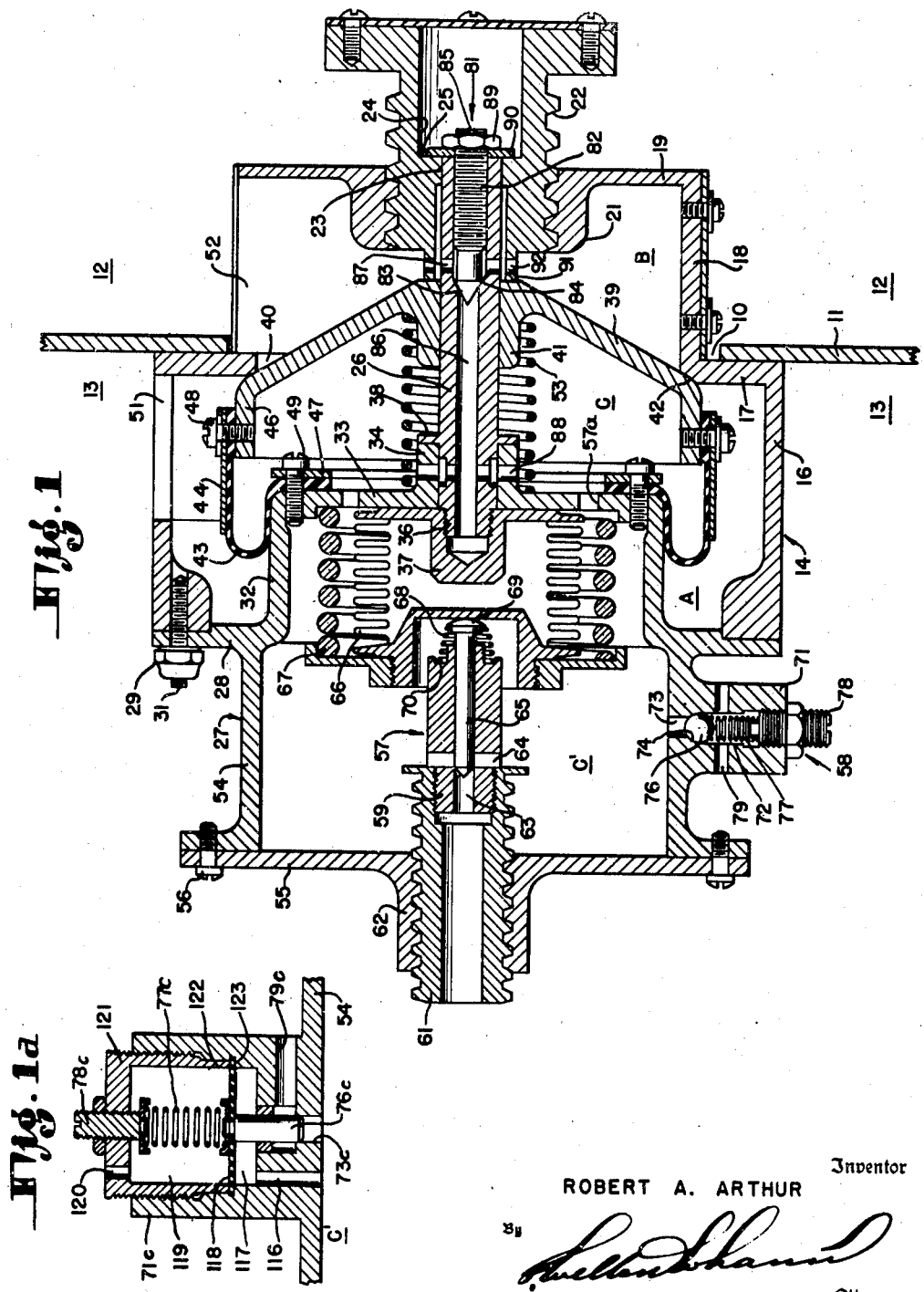

2,463,492

UNITED STATES PATENT OFFICE 2,463,492

PRESSURE REGULATOR

Robert A. Arthur, Santa Monica, Calif., assignor to The Garrett Corporation, Airesearch Manufacturing Company division, Los Angeles, Calif., a corporation of California Application December 4, 1944, Serial No. 566,442

15 Claims. (Cl. 98—1.5)

This invention relates in general to regulators for controlling pressure in enclosures and in particular to apparatus for pressurizing aircraft cabins. The regulator is particularly adapted to control pressurizing by the method in which cabin pressure is permitted to remain substantially the same as atmospheric pressure during aircraft ascent until a predetermined altitude has been reached, is maintained upon further ascent at a substantially constant level between that altitude and a second predetermined and higher altitude and, above said second predetermined altitude, is maintained at a substantially fixed differential relatively to external atmosphere. There are well recognized advantages in controlling cabin pressure in this manner, and this invention has as one of its objects to provide a regulator, capable of executing the method and which is of simple and inexpensive construction, is light in weight so as to add very little to the weight of the plane in which it is installed, and which may be provided in the form of a self-contained unit, completely assembled, capable of being furnished as a package article.

Another object is to provide a regulator, adaptable to be used in the pressurizing of aircraft cabins in accordance with the method described above, and which is not affected by dirt or moisture in the air which passes through it.

In the earlier cabin pressurizing systems adapted to carry out the pressurizing method described above, the absolute pressure responsive and the differential pressure responsive controls were each applied to separate full sized valves, each capable of handling the full flow of air circulating through the cabin. An important object of the present invention is to provide a simplified regulator having but a single valve to handle the circulating airflow, which valve is responsive to both absolute and differential pressure controls. This is accomplished by providing a control chamber in which air under pressure is adapted to actuate the main valve so as to maintain a pressure in the cabin bearing a fixed relation at all times to the pressure in the control chamber. The latter pressure is controlled by a pair of pilot valves, one of which is sensitive to the absolute pressure in the control chamber and the other of which is sensitive to the differential in pressure of the control chamber over ambient pressure. Since there is only a small circulation of air through the control chamber, these pilot valves may be, and are, relatively small in size, whereby the entire regulator may be made quite compact and in the form of a single package unit.

Another object of the invention is to provide a pressure regulator, adapted to control pressure in accordance with the method described above, and which may be adjusted so as to change any one or all of the points at which the control shifts from one stage of regulation to another.

Further objects and advantages of the invention will be brought out in the following part of the specification.

Referring to the drawing which is for illustrative purposes only,

Fig. 1 is an axial sectional view through a pressure regulator embodying the invention;

Fig. 1a is a sectional view of a modified form of the differential pressure control valve;

Fig. 2 is a graph showing the curves of pressure regulation which may be accomplished by the invention under various combinations of adjustment thereof;

Fig. 3 and Fig. 3a show modified forms of adjusting mechanism for the differential pressure control valve;

Fig. 4 shows another modified form of adjustment for the differential pressure control valve; and Fig. 5 shows a modified form of the adjustment for the absolute pressure control valve.

As an example of one form in which the invention may be embodied, I have shown in the drawing a pressure regulator adapted to be installed in an opening 10 in the wall 11 of a cabin enclosure. The space within the enclosure 11 is indicated at 12 and the external or ambient atmosphere is indicated at 13.

The pressure regulator of my invention comprises a valve casing 14 having an outer annular wall 16 preferably cylindrical in shape, having an offset wall 17 extending radially inwardly from the wall 16, having an inner annular wall 18 which is adapted to extend through the opening 10, and having an end wall 19 which is formed with an internally threaded boss 21. Threaded into the boss 21 is a tubular adjusting screw 22 having a bore 23 and a counterbore 24, with a shoulder 25 formed therebetween. In the bore 23 is piloted the inner end of a leak tube and valve guide 26.

A bellows housing 27 has a flange 28, by means of which it is mounted on the outer end of the annular wall 16, being secured by nuts 29 threaded on studs 31 fixed in the wall 16. The housing 27 has an inwardly extending annular skirt 32, the inner end of which is bridged by a web 33, having a boss 34. The outer end of the leak tube 26 is piloted in the boss 34 and has a reduced threaded end 36 on which is threaded a nut 37. Cooperating with a flange 38 on the leak tube 26, the nut 37 secures the tube against endwise movement.

The outflow of cabin air is directly controlled by a valve element 39 which has a hollow central boss 41 piloted on the tube 26 for sliding movement. The valve element 39 cooperates with a valve seat 42 formed in the valve casing 14 at the inner extremity of the offset wall 17 thereof, which inner extremity defines a valve port 40 of sufficient area to handle the circulation of air required for cabin ventilation. A flexible diaphragm 43 has its outer periphery secured between a sleeve 44 and a cylindrical peripheral wall 46 of the valve element 39, and has its inner peripheral portion secured between a ring 47 and the web 33. The sleeve 44 and the ring 47 are secured respectively by screws 48 and 49.

Defined between the valve element 39, the diaphragm 43, the skirt 32, and the valve casing wall 16 is a chamber A which is in communication with atmosphere 13 through an opening 51 in the wall 16. Defined between the valve element 39 and the inner casing walls 18 and 19 is a chamber B which is in communication with the cabin enclosure 12 through an opening 52 in the wall 18. The air being circulated through the cabin by a suitable air pump, e. g., a supercharger (not shown) escapes from the cabin by passing from the chamber B to the chamber A through the port 40 and between the valve element 39 and its seat 42. The cabin pressure is thus exerted directly against the valve element 39, tending to unseat it. This pressure is opposed by a light spring 53 (engaged between the valve element 39 and the web 33) which functions to seat the valve when air is not being pumped into the cabin. Cabin pressure against the valve element is also opposed by pressure in a chamber C defined between the valve element 39, the diaphragm 43 and the web 33, and in a communication chamber C', which is defined between the web 33, the skirt 32, an annular wall 54 extending outwardly from the flange 28 and forming part of the bellows housing 27, and a cap 55 which is secured by means of screws 56 to the outer end of the wall 54. The chambers C and C' communicate through openings 57a in the web 33.

The pressure in the chamber C, C' is controlled cooperatively by two pressure-sensitive pilot valves which, since they are not required to handle the flow of circulating cabin air, are relatively small, so that the entire apparatus may be embodied in a compact unit. Such pilot valves comprise an absolute pressure responsive valve indicated generally at 57, and a differential pressure responsive valve which is indicated generally at 58 and may be termed a second pilot valve. The valve 57 functions to maintain the pressure in the chambers C, C' at atmospheric pressure in the unpressurized or initial stage of operation lying in a range of altitudes between ground level and the level (for example 8000') at which it is desired to commence the pressurizing of the air within the cabin, and through the isobaric range (for example, from 8000' to 30,000') in which the chamber pressure is held substantially constant. The valve 58 controls the pressure within the chambers C, C' in the third, or differential pressure stage of operation, wherein a fixed differential between cabin pressure and ambient pressure is maintained in order to avoid over-straining the cabin structure. By thus controlling the pressure in the chambers C, C' acting against the chamber side of the valve element 39, the valve element 39 is operated so as to maintain pressure in the cabin enclosure 12 at the small amount above chamber pressure equivalent to the force of spring 53.

The valve 57 comprises a valve tube 59 mounted, as by threading, in the inner end of an externally threaded adjusting sleeve 61, the latter being threaded through an internally threaded boss 62 on the cap 55. The valve tube 59 has a bore 63 which is in communication with the chamber C' through ports 64. A valve stem 65, slidable in the bore 63, is adapted to bridge the ports 64 so as to close the bore 63. A sealed bellows 66 is engaged against the inner end of the stem 65, is urged by a spring 67 in an expanding direction in which it tends to close the valve 57, and is adapted to contract in response to pressure in the chamber C', there being formed between the bore permit the valve stem 65 to move to its open position under the pressure of a light spring 68 engaged between the head 69 of the valve stem 65 and a channel 70 in the inner end of the valve tube 59.

The differential pressure control valve 58 embodies a boss 71 having a bore 72 therein communicating through a reduced port 73 with the chamber C', there being formed between the bore 72 and the reduced port 73 a valve seat 74 against which is seated a ball valve element 76. A spring 77 is engaged between the valve element 76 and a plug 78 which is adjustably threaded into the boss 71. Adjustment of the plug 78 varies the compression of the spring 77, and thereby varies the differential maintained by the valve 58 between the chamber C' and ambient pressure. The bore 72 communicates with the atmosphere through ports 79.

A small amount of air is bled into the chamber C from the cabin enclosure 12 through a bleed valve, which is indicated generally at 81. This valve comprises a valve needle 82, threaded into the inner end of the leak tube 26, having at its inner end a conical valve nose 83 co-acting with a valve seat 84 at the inner end of a bore 86 in the tube 26, and having at its outer end a screw driver slot 85, by means of which it may be adjusted. Past the seat 84, the port 86 communicates through ports 87 with the chamber B, and near its outer end, the bore 86 communicates through ports 88 with the chamber C. Threaded on the outer end of the valve needle 82 is a nut 89 which clamps a washer 90 against the end of the tube 26, the washer 90 forming a stop to engage the shoulder 25 in the adjusting screw 22, in order to limit the backing off of the adjustment screw. The screw 22 has a skirt 91 which is adapted to engage the valve element 39 for unseating the same. The screw 22 is employed only when manual operation of the valve is desired for any reason. The skirt 91 has apertures 92 to provide communication between the chamber B and the ports 87.

As long as the airplane is below the ceiling determined as the upper limit for the initial or unpressurized stage of operation, the absolute pressure control valve 57 is maintained in open position by the collapsing of the bellows 66 under the pressure of the air in the chamber C', which follows any change in ambient atmosphere pressure as long as this valve remains open.

When air is pumped into the cabin enclosure 12, the valve element 39 will remain seated until the pressure has raised the slight amount necessary to overcome the pressure of the spring 53.

This slight raise in pressure, or operating pressure differential between cabin pressure and ambient pressure, is maintained throughout the initial or unpressurized stage of operations, in order to maintain the valve 39 open to permit the circulating air to escape from the cabin, providing ventilation.

As the plane ascends, ambient pressure will gradually drop, and there will be a corresponding drop in the pressure in the chamber C'. The pressure in the cabin will drop in step with the reduction in pressure in the control chamber C', the valve 39, in response to the drop in pressure in the control chamber C, always permitting sufficient air to escape so as to maintain the operating differential between the control chamber pressure and cabin pressure.

The change in ambient atmospheric pressure with rise in altitude is linearly depicted in Fig. 2 by the line 93, the corresponding change in cabin pressure is similarly indicated by the line 94, and the operating differential of pressure required merely for cabin ventilation flow is indicated by the vertical space between these two lines. The abscissa of the graph indicates altitude, rise in altitude being in the direction indicated by the arrow 95, and the ordinate indicates pressures, pressure drop being in the direction indicated by the arrow 96. The initial rise in pressure to establish the ventilating differential is indicated by the rise from ambient pressure at ground level, indicated at 0, to the slightly higher initial cabin pressure indicated at 0'.

When the airplane reaches the ceiling which has been determined as the upper limit for the initial or unpressurized stage of operation, the combined force of the spring 67 and the lowered differential of pressure on the evacuated bellows 66 will cause the bellows to expand to a position where the valve needle 65 is moved across the ports 64, closing the valve port 63 so as to prevent any further escape of air from the chamber C' to atmosphere. The regulator now enters the isobaric stage in which the related pressures in the chambers C, C' and in the cabin, are maintained at constant levels, which, for cabin pressure, is indicated by the portion a—b of the line 94, the point a indicating the beginning of this stage and the point b indicating the end thereof. During the unpressurized stage, the pressure in chambers C, C' is substantially atmospheric, and is indicated by the line 0—f in Fig. 2. During the isobaric stage, the pressure in chambers C, C' is indicated by the line f—g. Should the cabin pressure at any time exceed this level, the corresponding rise in the chamber C', resulting from the bleed in through the needle 81, will cause the bellows 66 to contract sufficiently to bleed off the excess pressure through the pilot valve 57. The valve 39 will respond to this decrease in pressure in the control chamber to bring the cabin pressure down to the fixed level, and the pilot valve 57 will again close. Actually the pilot valve 57 will never completely seal the chamber C' against the escape of air, since there will be a constant tendency for the bleed past the needle valve 81 to build up the pressure in the control chamber C' to the level of cabin pressure, and there will be a corresponding constant bleed through the valve 57 so as to maintain the required operating differential between cabin pressure and control chamber pressures. As the aircraft ascends further in the isobaric stage, there will be a gradual build up of differential in control chamber pressure over ambient pressure owing to the constant drop in ambient pressure below the fixed level established in the control chamber by the absolute pressure responsive pilot valve 57. This increase in differential is indicated by the vertical divergence between the line 93 and the dotted line f—g. When the airplane has ascended to the level which has been determined as the upper limit of the isobaric stage, the valve 58 which is, in effect, a pressure relief valve, will open under this pressure differential, and will thereafter remain open sufficiently to bleed from the chamber C' sufficient air to maintain this differential at a fixed value which is indicated by the vertical distance between the line 93 and the dotted line g—h, which represents control chamber pressure within this differential stage. Consequently, the pressure in the control chamber will be lowered in step with, but at a fixed differential above, ambient pressure, and cabin pressure will correspondingly be lowered as indicated by the portion b—c of the line 94. During this final or differential stage of operation, the valve 57 will, under the diminishing pressure in the control chamber, become and remain fully closed, the bleeding of air from the control chamber to atmosphere now taking place through the valve 58.

In the operation of the regulator it is necessary to bleed air from the cabin into the control chamber in order to build up the control chamber pressure in the differential stage. The necessity for doing this arises from the fact that the valve 58, being a check valve, is incapable of permitting an inflow of air into the chamber C'. Its control over the pressure in the descending differential pressure stage is therefore exercised by bleeding off the excess of the pressure which is bled into the chamber C' through the needle valve 81.

The altitude at which the isobaric range begins may, if desired, be raised by lowering the control chamber pressure at which the valve 57 is closed. This may be accomplished by backing off the threaded sleeve 61 so as to move the valve tube 59 outwardly, and thereby increase the range of movement of the valve needle 65 necessary to close off the ports 64. Such adjustment may be accomplished from the cockpit of the plane or from some point within the cabin by means of a Bowden wire connection 96a to the threaded sleeve 61, as shown in Fig. 5. With such an adjustment made, the initial or unpressurized stage would be extended as indicated by the broken line 97 of the graph from the point a to the point a', and the end of the isobaric stage would be correspondingly extended to b'. Conversely, by advancing the threaded sleeve 61 inwardly, the closing of the valve 57 may be caused to take place at a lower altitude, as indicated at d on the graph, giving an operational curve indicated by the dotted line 98 and the line b—c. Under such operation, the pressure in the cabin would be maintained at substantially ground level until the full maximum differential between cabin and ambient pressure has been attained, as indicated at d', and subsequently the cabin pressure would drop in step with the drop in ambient pressure.

The pressure differential in the third stage of operation may likewise be varied if desired. For example, by advancing the threaded plug 78 and thus increasing the tension on the spring 77, the pressure differential may be increased, so as to extend the isobaric range, as indicated by the dot-and-dash line 99 on the graph, from the terminal point b to the terminal point b". The portion b"—c' of the line 99 indicates the final or differential stage of operation under such conditions.

Adjustment of both valves 57 and 58 may result in further extension of the operational curve as indicated by the double dot-and-dash line 100.

A means for adjusting the valve 58 from the cabin is shown in Fig. 4, such means comprising a Bowden wire 101 in a sheath 102 which is anchored in a cap 103 mounted on the end of the boss 71a, the wire 101 being attached to a plug 78a threaded into the boss 71a and engaging the valve spring 77a.

In Fig. 3 I have shown a possible modification of the valve 58, in which a pair of valve balls 76 and 76b are arranged in series in the bore 72b of the elongated boss 71b, and are urged toward closed position in engagement with their respective seats 74 and 74b (the latter in the form of a hollow plug threaded into the bore 72b) by springs 77 and 77b. The springs 77 and 77b are abutted against hollow plugs 78' and 78b respectively threaded into the bore 72b. One end of a tube 104 communicates with the space within the bore 72b, between the valve balls 76 and 76b, and the other end of the tube 104 communicates with the atmosphere, so that, when opened, the tube 104 places atmospheric pressure between the two valve elements, and causes the valve element 76 to alone control the differential in accordance with the force exerted by its spring 77. The tube 104 passes through the cabin enclosure as shown and is provided therein with a manually operable valve 106, by means of which it may be closed so that the valves 76 and 76b will cooperatively control the differential pressure in accordance with the force exerted by either spring 77 or 77b. Necessarily, the force of spring 77b on ball 76b must be greater than that of spring 77 on ball 76, and these two forces determine at which pressure differential the regulator will respond. For example, if spring 77 loads ball 76 with a load equivalent to two pounds per square inch and spring 77b loads ball 76b with a load equivalent to three pounds per square inch, then, if valve 106 is open, the regulator will respond to a differential of two pounds per square inch. However, if the valve 106 is closed, the spring 77b and ball 76b will be in control of chamber pressure, and will only open when the differential attains to three pounds per square inch. Thus the valve controls the response of the regulator to differential pressures within the range of two pounds per square inch to three pounds per square inch. It is possible to calibrate the valve 106 for various thumb wheel positions to attain any desired differential within that range by providing a pointer on the wheel and a stationary indicator dial adjacent the pointer.

Fig. 3a illustrates another possible modification of the differential control valve, analogous to that shown in Fig. 3, but employing a pair of independent valves 58 and 58a, each of which may embody a valve housing member 71a, a valve port 73 in the wall 54a, a valve ball 76 cooperating with the valve seat 74 under the urging of a spring 77, and an apertured abutment member 78 adjustably threaded into the casing member 71a, to provide an abutment for the spring 77. Associated with the valve 58 is a manually operated stop cock valve 106a adapted to be closed so as to shut off the escape of air from the valve 58. The valve 58 may be set to open at a lower pressure than the pressure at which the valve 58a opens, and to thereby control the upper limit of the isobaric range as long as the stop cock valve 106a is open. Closing of the valve 106a will transfer the differential pressure control to the valve 58a, which will control the upper limits of the isobaric range at a higher pressure than the valve 58.

In Fig. 1a I have shown a modification of the structural features of the valve 58. In this form of construction the valve element 76c is in the form of a plunger cooperating with the port 73c and adapted, when retracted, to establish communication between the port 73c and the outlet port 79c. The valve element 76c is controlled by pressure from within the chamber C' communicated through a passage 116 to a chamber 117 in the valve casing 71c and on one side of a diaphragm 118, the other side of which is exposed to ambient pressure in a chamber 119 which communicates with atmosphere through a port 120 in a cap 121 threaded into the casing member 71c. The cap 121 has a flange 122 which clamps the periphery of the diaphragm 118 against a shoulder 123 in the casing 71c. The outer side of the diaphragm 118 is subject to the pressure of the spring 77c, which pressure may be adjusted by the adjusting screw 78c, threaded into the cap 121.

The absolute pressure responsive pilot valve adjustment means shown in Fig. 5 comprises the Bowden wire 96a which is secured to the adjustment sleeve 61 by means of a yoke device 111. The Bowden wire is sheathed in a tube 112 which is anchored in a yoke 113 secured to the boss 62. A knob 114 on the end of the Bowden wire 96 within the cabin permits the wire to be rotated so as to rotate the sleeve 61.

I claim as my invention:

1. In a mechanism for controlling the air pressure in an airplane cabin having an outlet for the escape of air from the cabin: a valve controlling the escape of air through said outlet, wall means cooperating with one side of said valve to form a control chamber therewith in which there may be maintained air under pressure tending to close said valve, the other side of said valve being exposed to the cabin pressure tending to open the valve, a restricted inlet adapted to be connected to a source of higher pressure, an outlet for the escape of air from said control chamber and adapted to be connected to a region of lower pressure, a pilot valve controlling the escape of air through said outlet adapted to permit the pressure in said control chamber to remain equalized with ambient pressure until the latter has dropped below a predetermined level, and means sensitive to the pressure in said chamber adapted to actuate said pilot valve when ambient pressure has dropped below said level and to thereafter maintain the pressure in said control chamber and, hence, in said cabin at a substantially constant level.

2. A regulator for controlling the pressure of air in an enclosure, said regulator including a casing having a portion adapted to project through an opening in the wall of said enclosure and provided with an inlet, said casing having another portion adapted to extend externally of said enclosure and having an outlet for communication with atmosphere, means defining a valve port establishing communication between said inlet and said outlet, an outwardly opening valve cooperating with said port to control the outflow of air from said enclosure through said port, a diaphragm joining said valve to said casing and cooperating therewith to define a control chamber in which air under pressure is adapted to act against the outer side of said valve to urge the same toward closed position, a light spring also urging said valve toward closed position, the inner side of said valve being exposed to the pressure in said enclosure tending to open the same, an inlet passage and an outlet passage for said control chamber, means sensitive to changes in control chamber pressure for controlling the outlet passage so as to control the pressure in said control chamber and thereby control the movement of said valve, and means carried by said inwardly projecting casing portion adapted to adjustably engage said valve to hold the same in an unseated position for manual operation.

3. Mechanism for controlling the air pressure in a cabin including: cabin pressure control means operable to control the pressure in said cabin; said pressure control means including a pressure sensitive element; a control chamber, said pressure sensitive element being responsive only to cabin pressure and control chamber pressure so that changes in either of said pressures cause a movement of said pressure sensitive element whereby said cabin pressure control means is operated to control said cabin pressure; and pressure control means for said control chamber including means responsive to control chamber pressure for controlling the pressure in said chamber.

4. Mechanism for controlling the air pressure in a cabin having an air flow passage, said mechanism including: a pressure sensitive element controlling said passage; a control chamber, said pressure sensitive element being exposed both to cabin pressure and control chamber pressure in such a manner that changes in either of said pressures cause a movement of said pressure sensitive element whereby said cabin pressure control means is operated to control said cabin pressure; an inlet passage and an outlet passage for said control chamber; means responsive to control chamber pressure for controlling one of said passages so as to control the pressure in said control chamber; and means, operably effective independently of the last mentioned means, responsive to a differential between control chamber pressure and ambient pressure for effecting changes in control chamber pressure.

5. In a mechanism for controlling the air pressure in an airplane cabin having means forming an outlet for the escape of air from the cabin: an outwardly opening valve controlling the escape of air through said outlet, means cooperating with the outer side of said valve to form a control chamber therewith in which there may be maintained air under pressure tending to close said valve, the inner side of said valve being exposed to the cabin pressure tending to open the valve means, means including a pilot valve, sensitive to the pressure in said control chamber, adapted, above a predetermined ambient pressure, to permit the escape of air from said control chamber to atmosphere, so as to equalize the control chamber's pressure with ambient pressure and, when ambient pressure drops below said predetermined level, to move towards closed position and to thereafter maintain the pressure in said control chamber and hence cabin pressure at a substantially fixed level until ambient pressure has dropped below a second predetermined level, a second pilot valve, sensitive to a predetermined differential in the pressure in said control chamber over ambient pressure and adapted, when said ambient pressure has dropped below said second predetermined level, to permit the escape of air from said control chamber sufficiently to maintain said differential and hence to maintain a fixed differential between cabin pressure and ambient pressure, and means to bleed air from the cabin into the control chamber while maintaining the pressure therein at levels determined by said pilot valves.

6. In mechanism for controlling the pressure in an aircraft cabin: walls defining a control pressure chamber; a movable pressure sensitive control element adapted to be subjected on one side to cabin pressure and to be subjected on the other side to control chamber pressure; an inlet passage for said control chamber adapted to connect said chamber with a source of higher pressure; an outlet passage adapted to connect said control chamber with a region of lower pressure; valves controlling the flow of air through one of said passages; an absolute pressure responsive device, absolutely responsive to control chamber pressure, for controlling one of said valves; and a differential pressure responsive device, responsive to variations in the differential of pressure between that in the control chamber and the pressure of the low pressure region, for controlling the other of said valves, said differential pressure responsive device operating independently of said absolute pressure responsive device.

7. Mechanism for controlling the pressure in an enclosure including: enclosure pressure control means operable to control the pressure in said enclosure, said pressure control means including a pressure sensitive element; a control chamber, said pressure sensitive element being exposed on one side to enclosure pressure and on the other side to control chamber pressure in such a manner that changes in either of said pressures cause a movement of said pressure sensitive element whereby said enclosure pressure control means is operated to control said enclosure pressure; inlet passage means for said control chamber; outlet passage means for said control chamber; a valve for controlling one of said passage means; pressure responsive means responsive to the pressure in said control chamber for operating said valve; a second valve for controlling one of said passage means; and a second pressure responsive means responsive to the differential between chamber pressure and the pressure outside said enclosure for controlling said second valve.

8. Mechanism for controlling the air pressure in a cabin including: cabin-pressure control means operable to control the pressure in said cabin, said pressure control means including a pressure sensitive element; a control chamber, said pressure sensitive element being exposed to cabin pressure and control chamber pressure in such a manner that changes in either of said pressures cause a movement of said pressure sensitive element whereby said cabin pressure control means is operated to control said cabin pressure; and pressure control means for said control chamber, including means responsive to control chamber pressure and independently operable in one flight range to maintain substantially constant the pressure in said control chamber, said pressure control means also including means responsive to the differential of pressure between the pressure in said control chamber and ambient pressure for preventing the pressure in said control chamber from exceeding a predetermined differential with respect to ambient pressure.

9. Mechanism for controlling the air pressure in a cabin including: cabin pressure control means operable to control the pressure in said cabin, said pressure control means including a pressure sensitive element; a control chamber, said pressure sensitive element being exposed both to cabin pressure and control chamber pressure in such a manner that changes in either of said pressures cause a movement of said pressure sensitive element whereby said cabin pressure control means is operated to control said cabin pressure; and pressure control means for said control chamber including pressure responsive means responsive to control chamber pressure and comprising the sole control means throughout one operating range to maintain the pressure in said control chamber at a substantially constant pressure irrespective of the altitude of said cabin.

10. Mechanism for controlling the pressure in an enclosure: enclosure pressure control means operable to control the pressure in said enclosure including a movable pressure sensitive control element; a control chamber, said pressure sensitive element being sensitive to control chamber pressure on one side and sensitive only to enclosure pressure on the other side whereby fluctuations in either of said pressures cause a movement of said pressure sensitive element whereby said enclosure control means is operated to control said enclosure pressure; an inlet passage for said control chamber; an outlet passage for said control chamber; a valve for controlling one of said passages; and a device responsive solely to control chamber pressure for controlling said valve.

11. In mechanism for controlling the pressure in an aircraft cabin: walls defining a control pressure chamber; a movable pressure sensitive control element subjected to control pressure on one side and adapted to be subjected to cabin pressure on its other side; an inlet passage for the control chamber; an outlet passage for said control chamber; a valve for controlling one of said passages; and a device responsive to control chamber pressure operable in one range of flight for controlling said valve so as to maintain the pressure in the control chamber at a substantially constant level independently of the altitude of the plane in said range.

12. In mechanism for controlling the pressure in an aircraft cabin: walls defining a control pressure chamber; a movable pressure sensitive control element subjected to control pressure on one side and adapted to be subjected to cabin pressure on its other side; an inlet passage for the control chamber; an outlet passage for said control chamber; a valve for controlling one of said passages; a device responsive to control chamber pressure comprising the sole means for controlling said valve so as to control the pressure in said control chamber in one range of operation of the plane; and a second device, responsive to the differential of pressure between that in the control chamber and ambient atmosphere for controlling the pressure in said chamber in another range of operation.

13. Mechanism for controlling the pressure in an enclosure including: enclosure pressure control means operable to control the pressure in said enclosure, said pressure control means including a pressure sensitive element; a control chamber, said pressure sensitive element being sensitive on one side to control chamber pressure and being sensitive on the other side only to enclosure pressure; and pressure control means for said control chamber including as its sole responsive means a pressure responsive means responsive to control chamber pressure and adapted to maintain substantially constant the pressure in said control chamber.

14. In a pressure control mechanism for controlling the pressure in an enclosure, the combination of: a control chamber; means comprising a movable wall and valve arrangement movable to control the flow through an outlet of said enclosure, said movable wall being subjected to chamber pressure on one side and enclosure pressure on the other side; and pressure control means for said control chamber including pressure responsive means responsive only to control chamber pressure and comprising the sole means controlling the pressure in said control chamber in one range of operation.

15. In a pressure control mechanism for controlling the pressure in an enclosure, the combination of: a control chamber; a movable wall having associated therewith valve means for controlling an outlet passage of said enclosure, said wall means being subjected to chamber pressure on one side and enclosure pressure on the other side whereby a change in either of said pressures will move said movable wall; and means responsive to control chamber pressure operable throughout a range of operation of said pressure control mechanism for maintaining constant the pressure in said control chamber whereby fluctuations in said enclosure pressure will move said movable wall and thus position said valve means to control the pressure in said enclosure.

ROBERT A. ARTHUR.

REFERENCES CITED

The following references are of record in the file of this patent:

UNITED STATES PATENTS

| Number | Name | Date |
|---|---|---|
| 2,002,057 | Gregg | May 21, 1935 |
| 2,208,554 | Price | July 16, 1940 |
| 2,258,054 | Heidbrink | Oct. 7, 1941 |
| 2,307,199 | Cooper | Jan. 5, 1943 |
| 2,391,197 | Schwein | Dec. 18, 1945 |
| 2,393,343 | Schroeder | Jan. 22, 1946 |
| 2,396,116 | Noxon | Mar. 5, 1946 |
| 2,399,326 | Crot | Apr. 30, 1946 |
| 2,402,681 | Schroeder | June 25, 1946 |
| 2,407,257 | Del Mar | Sept. 10, 1946 |
| 2,407,258 | Del Mar | Sept. 10, 1946 |
| 2,413,027 | Maxson | Dec. 24, 1946 |
| 2,414,202 | Jepson et al. | Jan. 14, 1947 |
| 2,419,707 | Cooper et al. | Apr. 29, 1947 |

FOREIGN PATENTS

| Number | Country | Date |
|---|---|---|
| 521,623 | Great Britain | May 27, 1940 |
| 563,553 | Great Britain | Aug. 21, 1944 |

Certificate of Correction

March 1, 1949.

Patent No. 2,463,492.

ROBERT A. ARTHUR

It is hereby certified that error appears in the printed specification of the above numbered patent requiring correction as follows:

Column 4, line 19, for the comma and words ", there being formed between the bore" read *above a predetermined limit so as to;* and that the said Letters Patent should be read with this correction therein that the same may conform to the record of the case in the Patent Office.

Signed and sealed this 23rd day of August, A. D. 1949.

[SEAL]

THOMAS F. MURPHY,
*Assistant Commissioner of Patents.*